(12) United States Patent  
Watanabe (10) Patent No.: US 10,087,032 B2  
(45) Date of Patent: Oct. 2, 2018

(54) COATING FILM TRANSFER TOOL

(71) Applicant: FUJICOPIAN CO., LTD., Osaka-shi, Osaka (JP)

(72) Inventor: Kazuya Watanabe, Osaka (JP)

(73) Assignee: FUJICOPIAN CO., LTD., Osaka (JP)

( * ) Notice: Subject to any disclaimer, the term of this patent is extended or adjusted under 35 U.S.C. 154(b) by 0 days.

(21) Appl. No.: 15/506,414

(22) PCT Filed: Apr. 24, 2015

(86) PCT No.: PCT/JP2015/062524  
§ 371 (c)(1),  
(2) Date: Feb. 24, 2017

(87) PCT Pub. No.: WO2016/035379  
PCT Pub. Date: Mar. 10, 2016

(65) Prior Publication Data  
US 2017/0253455 A1    Sep. 7, 2017

(30) Foreign Application Priority Data

Sep. 1, 2014   (JP) ................... 2014-177293

(51) Int. Cl.  
*B65H 23/032*    (2006.01)  
*B43L 19/00*    (2006.01)  
(Continued)

(52) U.S. Cl.  
CPC ......... *B65H 37/007* (2013.01); *B29C 66/861* (2013.01); *B65H 23/032* (2013.01);  
(Continued)

(58) Field of Classification Search  
CPC .......................... B65H 37/007; B65H 23/032; B65H 35/0053; B43L 19/00; B29C 66/861; B65C 11/00  
(Continued)

(56) References Cited

U.S. PATENT DOCUMENTS 4,851,076 A * 7/1989 Manusch .................. B05C 1/14  
                                                                       156/577  
5,499,877 A    3/1996 Sakanishi et al.  
(Continued)

FOREIGN PATENT DOCUMENTS

EP       0755889 A1    1/1997  
JP       6-286927 A    10/1994  
(Continued)

OTHER PUBLICATIONS

English translation of WO2014203756.*  
(Continued)

*Primary Examiner* — Sonya M Sengupta  
(74) *Attorney, Agent, or Firm* — Westerman, Hattori, Daniels & Adrian, LLP (57) ABSTRACT

Provided is a coating film transfer tool in which a coating film can be transferred onto a transfer-target surface in a straight manner without the coating film meandering, even if the coating film transfer tool meanders when the coating film is being transferred. The coating film transfer tool includes a feeding portion; a transfer press portion; and a winding portion. The transfer press portion is provided with a transfer head that transfers the coating film, the transfer head can move in a width direction of the transfer tape independent of the feeding portion and the winding portion. The transfer head is provided with a pair of guide walls that use their inner surfaces to restrict movement of the transfer tape. The pair of guide walls and a tip portion of the transfer head can press against the transfer-target surface at the same time.

3 Claims, 3 Drawing Sheets

(51) Int. Cl.
| | |
|---|---|
| *B29C 65/56* | (2006.01) |
| *B32B 37/14* | (2006.01) |
| *B32B 37/26* | (2006.01) |
| *B65H 37/00* | (2006.01) |
| *B65H 35/00* | (2006.01) |
| *B29C 65/00* | (2006.01) |
| *B65C 11/00* | (2006.01) |

(52) U.S. Cl.
CPC .......... *B65H 35/0053* (2013.01); *B43L 19/00* (2013.01); *B65C 11/00* (2013.01)

(58) Field of Classification Search
USPC ................................. 156/162, 249, 459, 579
See application file for complete search history.

(56) References Cited

U.S. PATENT DOCUMENTS

| | | | | |
|---|---|---|---|---|
| 6,830,089 | B1* | 12/2004 | Tamai | ................. B65H 37/007 118/257 |
| 2002/0189765 | A1 | 12/2002 | Bebensee et al. | |
| 2004/0154752 | A1 | 8/2004 | Huthmacher et al. | |

FOREIGN PATENT DOCUMENTS

| | | |
|---|---|---|
| JP | 10-157391 A | 6/1998 |
| JP | 10-236081 A | 9/1998 |
| JP | 10-315688 A | 12/1998 |
| JP | H11-34586 A | 2/1999 |
| JP | 2003-525771 A | 9/2003 |
| JP | 2004-009546 A | 1/2004 |
| JP | 2006-123255 A | 5/2006 |
| JP | 2007-160567 A | 6/2007 |
| JP | 2014-213553 A | 11/2014 |
| WO | 2014/203756 A1 | 12/2014 |

OTHER PUBLICATIONS

English translation of JP2007160567.*
International Search Report dated Jul. 28, 2015, issued in counterpart International Application No. PCT/JP2015/062524 (2 pages).
Extended European Search Report dated Mar. 13, 2018, issued in European Patent Application No. 15838671.4.

* cited by examiner

COATING FILM TRANSFER TOOL

TECHNICAL FIELD

The present invention relates to the technical field of coating film transfer tools that are pressed against a transfer target body to transfer coating films for text correction, adhesive films for bonding, decorative coating films, and the like.

BACKGROUND ART

Conventionally, coating film transfer tools have been used in which a transfer tape, which is a coating film provided on a backing tape, is fed from a feeding portion and a transfer press portion presses the coating film to be transferred onto a transfer-target surface, and then the backing tape of the transferred coating film is wound up. With such coating film transfer tools, there are many applications in which the coating film is to be transferred in a straight manner on the transfer-target surface without meandering, that is to say applications requiring straightness. For example, if only one line in a passage that has many lines with small gaps therebetween is to be concealed by transferring a coating film for correction thereon, straightness is required.

If the coating film transfer tool meanders, the coating film also meanders, and there is a concern of concealing a line that is different from the line that was to be originally concealed. Also, if the coating film transfer tool cannot be dragged in a straight manner by the user and meanders a large amount, there are cases where the transfer tape comes off from the transfer head and the transfer tape cannot be drawn out, and the transfer tape can no longer travel. Patent Literature 1 and Patent Literature 2 disclose a ruler that, in cases where the coating film transfer tool is to be used in an application that requires straightness, is used along with the coating film transfer tool in order to transfer the coating film in a straight manner and not meander. However, in the inventions disclosed in Patent Literature 1 and Patent Literature 2, because a ruler is used to transfer the coating film, the user needs to carry both the coating film transfer tool and the ruler, and therefore there is concern of the ruler being misplaced, and the usability is poor. Thus, the applicant of the present invention has made an application for an invention regarding a coating film transfer tool in which the ruler is unlikely to be misplaced (Japanese Patent Application No. 2013-093623). In this application, a ruler that is integrated with a transfer head cover is described (described as a transfer guide in the aforementioned application), but the transfer head cover was too large while the ruler was too small, and the improvement in usability was insufficient.

Also, the applicant of the present invention has made an application (Japanese Patent Application No. 2013-129219) for an invention regarding a coating film transfer tool X that is not likely to meander even if another tool such as a ruler is not used. The transfer head of the coating film transfer tool X has a tip portion (the part described as a transfer press portion in the aforementioned application) that presses transfer tape onto a transfer-target surface and a pair of tape restriction members that restrict movement in the width direction of the transfer tape, and therefore the coating film transfer tool is not likely to meander. Since the pair of tape restriction members can elastically deform independent of other portions of the transfer head such as the tip portion, and have a means that prevents the distance between the pair of tape restricting members from increasing, when the transfer head is pressed onto the transfer-target surface, the pair of tape restriction members elastically deform without the distance between the restriction members increasing, and press against the transfer-target surface along with the tip portion. In this way, in the coating film transfer tool X, the coating film is transferred while the pair of tape restriction members, which deform elastically, and the tip portion are pressed against the transfer-target surface, and thus the contact area between the coating film transfer tool and the transfer-target surface increases, and the coating film transfer tool X is unlikely to meander. Also, with the coating film transfer tool X, both side portions of the transfer tape are restricted by the pair of tape restriction members that are pressed against the transfer-target surface, and thus the transfer tape does not come off from the transfer head.

CITATION LIST

Patent Literature

Patent Literature 1: JP H10-157391A
Patent Literature 2: JP H10-315688A

SUMMARY OF INVENTION

Technical Problem

In this way, the transfer head of the coating film transfer tool X has a structure in which transfer tape does not come off from the transfer head, and the coating film transfer tool is not likely to meander. However, when the user causes the transfer head of the coating film transfer tool X to meander with a strong force, there are cases where the transferred coating film meanders.

A problem to be solved by the present invention is providing a coating film transfer tool that is able to transfer a coating film onto a transfer-target surface in a straight manner without meandering, without using another tool such as a ruler, even if the coating film transfer tool meanders while transferring the coating film.

Solution to Problem

A coating film transfer tool according to a first invention includes: a feeding portion configured to feed a transfer tape in which a coating film is provided on a backing tape; a transfer press portion configured to press the transfer tape onto a transfer-target surface to transfer the coating film; and a winding portion configured to wind up the backing tape after the coating film has been transferred, by rotating in conjunction with the feeding portion, wherein the transfer press portion is provided with a transfer head configured to transfer the coating film, the transfer head is movable in a width direction of the transfer tape independent of the feeding portion and the winding portion, the transfer head is provided with a pair of guide walls configured to use their inner surfaces to restrict movement in the tape width direction of the transfer tape from which the coating film is yet to be transferred, and the pair of guide walls and a tip portion of the transfer head configured to transfer the coating film is configured to press against the transfer-target surface at the same time.

A coating film transfer tool of a second invention is the coating film transfer tool of the first invention, further including an elastic portion configured to elastically deform when the transfer head moves in the width direction of the transfer tape, and bias the transfer head in a direction opposite to a direction in which the transfer head moves.

A coating film transfer tool of a third invention is the coating film transfer tool of the first or second invention, further including a holding member that holds the feeding portion and the winding portion, wherein a shaft provided on the holding member is inserted into a hole provided in the transfer head, and the transfer head is configured to move in the width direction of the transfer tape relative to the holding member due to the hole sliding along the shaft.

A coating film transfer tool of a fourth invention is the coating film transfer tool of the third invention, wherein the shaft and the hole have a circular cross-sectional shape, and the transfer head is rotatable around the shaft.

Advantageous Effects of Invention

As a result of the tip portion of the transfer head that transfers the coating film and the guide walls that restrict the movement of the transfer tape being pressed against the transfer-target surface at the same time, the contact area between the transfer head and the transfer-target surface increases, the transfer head is unlikely to meander along the transfer-target surface, and the transfer tape can be prevented from coming off from the transfer head while the coating film is being transferred. Furthermore, the transfer head can move in the width direction of the transfer tape, independent of the feeding portion and the winding portion, and thus even if the whole coating film transfer tool meanders, the transferred coating film can be transferred onto the transfer-target surface in a straight manner without meandering, provided that the meandering of the transfer head is within a range in which the transfer head can move in the width direction of the transfer tape.

BRIEF DESCRIPTION OF DRAWINGS

FIGS. 1a to 1g are diagrams showing a coating film transfer tool A according to a first embodiment of the present invention.

DESCRIPTION OF EMBODIMENTS

Figures 1A, 1B, 1C, 1D, 1F, 1G:
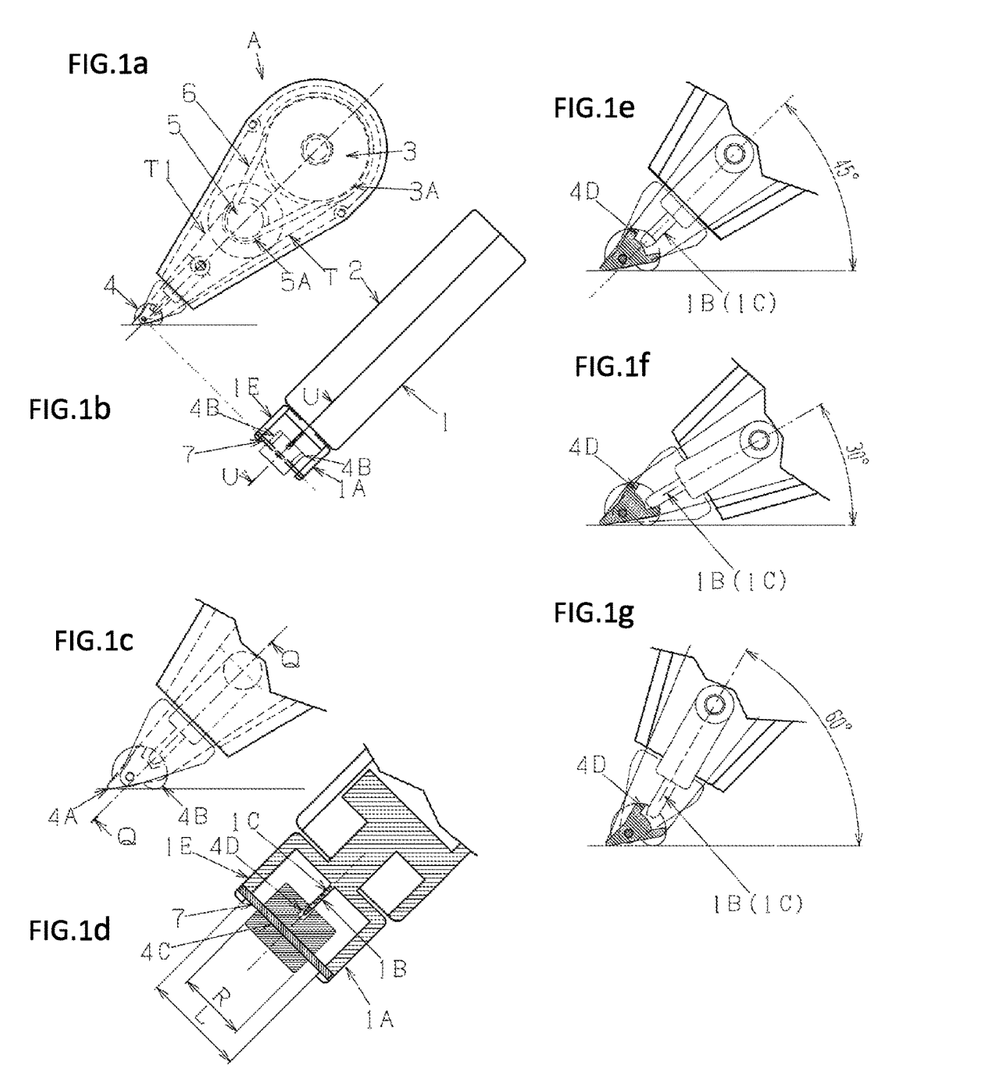

FIGS. 1a to 1g are diagrams showing a coating film transfer tool A according to a first embodiment of the present invention, FIG. 1a is a front view in which a cover has been removed. FIG. 1b is a bottom view of the coating film transfer tool A in which the cover is attached, FIG. 1c is an enlarged view of the periphery of a transfer head 4, FIG. 1d is a cross-sectional view taken along Q-Q in FIG. 1c, FIG. 1e is a cross-sectional view taken along U-U in FIG. 1b, and FIGS. 1f and 1g are cross-sectional views taken along U-U in FIG. 1b, in which the pressing angle of the coating film transfer tool A relative to the transfer-target surface changes. After a transfer tape T, which is a coating film provided on a backing tape T1, has been fed from a feeding portion, and a transfer press portion has pressed the transfer tape T onto a transfer target surface to transfer the coating film, the coating film transfer tool A can wind up the backing tape T1. Also, the coating film transfer tool A employs a configuration in which a feeding core 3 that feeds the transfer tape T and a winding core 5 that winds up the backing tape T1 rotate in conjunction so that the wind-up length of the backing tape T1 is longer than the feeding length of the transfer tape T, and as a result of appropriate tension acting on the transfer tape T, the transfer tape T does not become slack.

In the coating film transfer tool A, as a result of arranging an O ring 6 to span a pulley portion 3A of the feeding core 3, around which the transfer tape T is wound, and a pulley portion 5A of the winding core 5, which winds up the backing tape T1 after the coating film is transferred, the feeding core 3 and the winding core 5 rotate in conjunction, but the method for rotating the feeding core 3 and the winding core 5 in conjunction is not limited to this method. Any method of rotating in conjunction may be employed as long as it is set such that the length of the backing tape T1 wound up by the winding portion is longer than the length of the transfer tape T fed from the feeding portion, and a mechanism is employed in which slipping occurs to resolve this difference.

In this coating film transfer tool A, the transfer head 4 can transfer the coating film while it presses against the transfer-target surface at at least three positions, namely a tip portion 4A that transfers the coating film and a pair of guide walls 4B, at the same time. The pair of guide walls 4B fulfil the role of restricting movement in the tape width direction of the transfer tape T. In the coating film transfer tool A, the tip portion 4A of the transfer head is a spatula-shaped plate, but a roller that is held so as to be able to rotate may be provided as the tip portion 4A. If the coating film is an adhesive film for bonding, it is preferable that a roller is provided and that the transfer tape is pressed by the roller.

In a state where only the tip portion 4A that transfers the coating film is pressed against the transfer-target surface, the transferred coating film is likely to meander. In a state where only the tip portion 4A is pressed against the transfer-target surface, a state occurs where only the transfer tape T comes into contact with the transfer-target surface, and the tip portion 4A rides on the transfer tape. The back surface of the transfer tape T, on which the tip portion 4A rides, has undergone release processing, and thus the tip portion 4A on the transfer tape T can easily slide in the width direction of the transfer tape relative to the transfer tape. Thus, the transfer head 4 is likely to meander in the width direction of the transfer tape. As a result of the transfer head 4 being likely to meander, the transferred coating film is also likely to meander.

In contrast to this, in the coating film transfer tool A, the transfer head 4 can transfer the coating film while it presses against the transfer-target surface at at least three positions, and thus it is possible to make it unlikely for the transfer head 4 to slide along the transfer-target surface and to make it unlikely for the transferred coating film to meander.

As shown in FIGS. 1a and 1b, in the coating film transfer tool A, a holding member that holds the aforementioned feeding portion and the winding portion is constituted by a case 1 and a cover 2. Also, the transfer head 4 is a separate member that is independent of the case 1 and the cover 2, and the transfer head 4 can move in the width direction the transfer tape T relative to the case 1 and the cover 2.

The case 1 has side walls 1A and 1E that protrude toward the transfer head 4. As shown in FIG. 1d, a shaft 7 bridges the side wall 1A and the side wall 1E. By inserting the shaft 7 into a hole 4C of the transfer head 4, the transfer head 4 is attached so as to be between the side wall 1A and the side wall 1E. The shaft 7 is press fitted into holes provided in the side wall 1A and the side wall 1E and is fixed so as not to come apart from the side wall 1A and the side wall 1E.

The cross section of the shaft 7 is a circle, and the hole 4C of the transfer head 4 is a circle that is slightly larger than the shaft 7 is, and therefore the hole 4C of the transfer head 4 can slide in the longitudinal direction of the shaft 7 relative to the shaft 7. The distance (L in FIG. 1d) between the inner surfaces of the side wall 1A and the side wall 1E is larger than the width (R in FIG. 1d) of the transfer head 4. For this reason, the transfer head 4 can move between the side walls 1A and 1E for a distance that is the difference between the distance L and the width R.

The material of the shaft 7 of the coating film transfer tool A needs to be able to withstand the pressing force of the pressed transfer head 4, and thus a metal such as stainless steel is preferable, but a plastic material may be used provided that the pressing force can be withstood. Also, the shaft 7 of the coating film transfer tool A is configured as a single part between the side wall 1A and the side wall 1E, and is a part that is separate from the case 1, but the shaft 7 may be configured by two shafts respectively protruding from and integral with the side wall 1A and the side wall 1E, provided that the pressing force can be withstood.

In the coating film transfer tool A, the transfer head 4 can move between the side wall 1A and the side wall 1E. For this reason, even if the holding member constituted by the case 1 and the cover 2 held by the user meanders in the left-right direction relative to the travel direction of the transfer tape T, as long as the meandering is within a range of being absorbable by the movement of the transfer head 4 between the side wall 1A and the side wall 1E, the transfer head 4 does not meander, and as a result, the transferred coating film does not meander. The reason for this is, in the coating film transfer tool A, the transfer head 4 can transfer the coating film while it presses against the transfer-target surface at at least three positions, and therefore the transfer head 4 slides in the holding member and does not slide on the transfer-target surface even if the holding member meanders left and right.

The larger the difference between the distance L between the inner surfaces of the side wall 1A and the side wall 1E and the width R of the transfer head 4, the larger the range in which meandering of the transfer head 4 can be absorbed. However, the transfer tape T is straight from the feeding portion of the coating film transfer tool A to the transfer head 4 that is the transfer pressing portion, and the backing tape T1, after the coating film has been transferred, is similarly straight from the transfer head 4 to the winding portion. For this reason, if the movement amount of the transfer head 4 between the side wall 1A and the side wall 1E is excessive, it is conceivable that the transfer tape T will abruptly bend due to movement of the transfer head 4, and travel failures such as the transfer tape T breaking will occur. In consideration of preventing travel failure of the transfer tape T and the backing tape T1 caused by abrupt bending of the transfer tape T, it is preferable that the difference between L and R is 1 mm or more to 4 mm or less, and is more preferably 2 mm or more to 3 mm or less. When the difference between L and R is less than 1 mm, the effect of preventing meandering of the transfer head 4 is reduced, and when the difference between L and R exceeds 4 mm, there is concern that the transfer tape T and the backing tape T1 will fail to travel.

As shown in FIG. 1d, in the coating film transfer toot A, an elastic portion 1B that protrudes from the case 1 is inserted into a recessed portion 4D of the transfer head 4. When the transfer head 4 moves along the shall 7, the elastic portion 1B is pressed by the inner wall of the recessed portion 4D and deforms elastically. As a result of the elastic portion 1B elastically deforming the transfer head 4 is biased in the direction opposite to the direction in which the transfer head 4 is moving.

It is preferable to set the slide resistance of the transfer head 4 on the shaft 7 to be low such that the transfer head 4 can slide along the shaft 7 with a small force. This is because, if it is difficult for the transfer head 4 to slide along the shaft 7, there are cases where the effect of preventing meandering of the transfer head is reduced. However, if the slide resistance of the transfer head 4 on the shaft 7 is too small, when the difference between the distance L between the inner surfaces of the side wall 1A and the side wall 1E and the width R of the transfer head 4 is large, there are cases where the usability of the coating film transfer tool is poor. When transfer of the coating film is to start, the user attempts to press the tip portion 4A of the transfer head that transfers the coating film, to a transfer start position on the transfer-target surface. At this time, if the slide resistance of the transfer head 4 relative to the shaft 7 is too small, the transfer head 4 moves along the shaft 7 when pressing is performed, and a position different from the targeted position may be pressed.

The slide resistance between the transfer head 4 and the shaft 7 is influenced not only by the dimensions of the hole 4C and the shaft 7, but also by the state of the inner surface of the hole 4C and the outer surface of the shaft 7 and the like, and thus there are cases where it is difficult to adjust these factors to appropriate values. However, in the coating film transfer tool A, the slide resistance itself is reduced as much as possible, and resistance to movement of the transfer head 4 along the shaft 7 is adjusted to an appropriate value by using the biasing force of the elastic portion 1B. For this reason, in the coating film transfer tool A, when pressing is started, the transfer head does not press against a position that is different from the targeted position, and even if the holding member meanders, since the transfer head 4 absorbs meandering of the holding member by moving relative to the holding member, the transfer head 4 does not meander, resulting in a transferred coating film that does not meander.

In the coating film transfer tool A, the cross-sectional shape of the shaft 7 and the shape of the hole 4C are circles, and thus the transfer head 4 can easily rotate around the shaft 7. For this reason, with the coating film transfer tool A, even if the user does not press the transfer head 4 against the transfer-target surface actively attempting to bring three positions including the tip portion 4A and the guide walls 4B (two positions) into contact with the transfer-target surface, the transfer head 4 rotates around the shaft 7 and the transfer-target surface can be easily pressed against at these three positions.

However, if the transfer head 4 can rotate around the shaft 7 unrestricted, a situation is conceivable in which the tip portion 4A that transfers the coating film rotates to a position at which the coating film cannot be transferred and the coating film cannot be transferred. Thus, a stopper 1C that stops the rotation of the transfer head 4 around the shaft 7 is provided in the coating film transfer tool A. In the coating film transfer tool A, the elastic portion 1B and the stopper 1C are the same member, and as shown in FIG. 1f and FIG. 1g, the transfer head 4 can rotate to the extent that the transfer angle is in the range of 30 to 60 degrees. In the coating film transfer tool A, the elastic portion 1B and the stopper 1C are the same member, but there is no need for the elastic portion 1B and the stopper 1C to be the same member, and they can be separate portions of the same part or separate parts. The functions required of the elastic portion 1B and the stopper 1C are different from each other. The elastic portion 1B is required to have the functions of elastically deforming in accordance with the movement of the transfer head 4, and biasing the transfer head 4 using the elastic force that is generated by the elastic deformation. In contrast to this, the stopper 1C has the function of stopping the rotation of the transfer head 4, and thus it is necessary that the stopper 1C does not elastically deform under force from the transfer head 4. In this way, the functions required of the elastic member 1B and the stopper 1C are different from each other, and thus it is preferable that the dual-purpose member for the elastic member 1B and the stopper 1C of the coating film transfer tool A has a shape that is thick in the rotation direction around the shaft 7 of the transfer head 4 and that is thin in the width direction of the transfer tape T in which the transfer head 4 moves.

Figure 3:
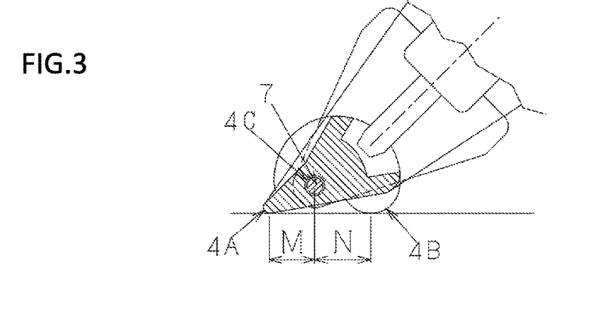
FIG. 3 is a diagram showing the periphery of a transfer head 4 of the coating film transfer tool A.

As shown in FIG. 3, in the transfer head 4 of the coating film transfer tool A, it is preferable that the hole 4C is provided at a position closer to the tip portion 4A than positions where the guide walls 4B come into contact with the transfer-target surface (hereinafter "guide wall contact positions") at the time of pressing and transfer. In the coating film transfer tool A, the holding member that is constituted by the case 1 and the cover 2 is held in the hand of the user, and the transfer head 4 is pressed against the transfer-target surface. The force with which the user performs pressing is transmitted from the holding member to the shaft 7, then from the shaft 7 to the transfer head 4, and then from the tip portion 4A of the transfer head 4 and the guide wall contact positions to the transfer-target surface. The hole 4C into which the shaft 7 is inserted is provided closer to the tip portion 4A than to the guide wall contact positions, and therefore the pressing force from the user is mainly transmitted toward the tip portion 4A, and the coating film is transferred from the transfer tape T. It is preferable that, in a state where the transfer-target surface is pressed against by the tip portion 4A and the guide walls 4B (two positions), for a total of three positions, a ratio (M/N) (see FIG. 3) of a distance M that is between the tip portion 4A and the hole 4C and is parallel to the transfer-target surface and a distance N that is between the hole 4C and a guide wall contact position and is parallel to the transfer-target surface, is in a range of 6/14 to 10/10, and more preferably in a range of 7/13 to 9/11. If this ratio (M/N) is less than 6/14, the force with which the transfer-target surface is pressed by the guide walls 4B (two positions) is too small, and the effect of preventing the transfer head 4 from meandering may decrease. On the other hand, if the ratio (M/N) exceeds 10/10, the proportion of the force used at the tip portion 4A, from the pressing force applied to the coating film transfer tool, may decrease, and thus the pressing force that is applied to the coating film transfer tool when the coating film is to be transferred needs to be increased, and the operability of the coating film transfer tool may become poor.

Figure 2A:
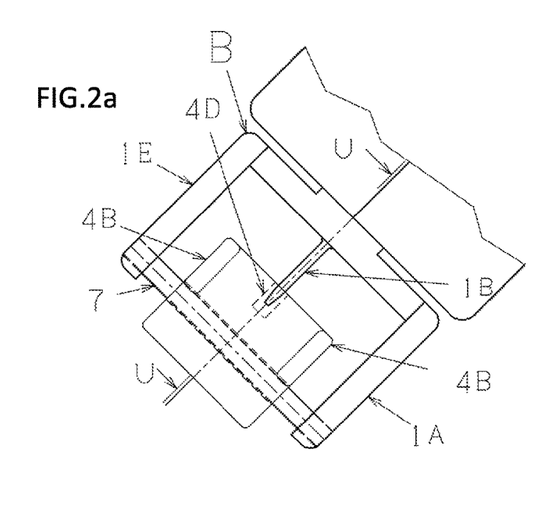
FIGS. 2a and 2b are diagrams slowing a coating film transfer tool B according to a second embodiment of the present invention.
Figure 2B:
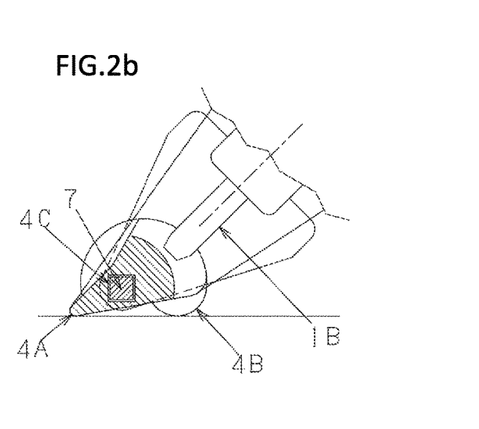

FIGS. 2a and 2b show the periphery of a transfer head of a coating film transfer tool B according to a second embodiment of the present invention. FIG. 2a is an enlarged view of the periphery of the transfer head 4, and FIG. 2b is a cross-sectional diagram taken along U-U in FIG. 2a. The coating film transfer tool B is the same as the coating film transfer tool A in the first embodiment, except that the cross-sectional shape of the shaft 7 and the shape of the hole 4C are quadrangular. In the coating film transfer tool of the present invention, the transfer head 4 can transfer the coating film while it presses against the transfer-target surface at at least three positions at the same time, namely the tip portion 4A that transfers the coating film and the pair of guide walls 4B, and as a result of pressing against the transfer-target surface at three positions, it is unlikely that the transfer head 4 will slide on the transfer-target surface, and meandering of the transfer head 4 is prevented. In the coating film transfer tool B, the cross-sectional shape of the shaft 7 and the shape of the hole 4C is quadrangular, and therefore the transfer head 4 does not rotate around the shaft 7. Accordingly, in the coating film transfer tool B, in an attempt to press the transfer head 4 against the transfer-target surface at a total of three positions, namely the tip portion 4A and the guide walls 4B (two positions), if the user does not actively try to make contact with the transfer-target surface at these three positions from the beginning when pressing the transfer head 4 against the transfer-target surface, the transfer-target surface cannot be pressed against at these three positions, but a stopper that stops rotation of the transfer head 4 such as that in the coating film transfer tool A is not required, and therefore the building of and structure design can be easily performed.

In the coating film transfer tools A and B according to the above-described embodiments, the transfer head can move in the width direction of the transfer tape, independent of the feeding portion and the winding portion, and thus even if the entire coating film transfer tool meanders, the transferred coating film can be transferred in a straight manner on the transfer-target surface without meandering, provided that the meandering of the transfer head is within a range in which the transfer head can move in the width direction of the transfer tape. Furthermore, as a result of pressing the tip portion of the transfer head that transfers the coating film and the guide walls that restrict movement of the transfer tape against the transfer-target surface at the same time, the contact area between the transfer head and the transfer-target surface increases, the transfer head is unlikely to meander along the transfer-target surface, and the transfer tape can be prevented from coming off from the transfer head when the coating film is being transferred.

Working Examples

A transfer tape was obtained by applying, for a length of 6.2 m, a coating film for correction tape to a PET film that is 6 mm wide and has undergone double-side release processing, and this transfer tape was wound around the feeding core 3 shown in FIG. 1a to prepare a pancake on the feeding side. A transfer tool A1 of Working Example 1 was prepared by storing this feeding side pancake in the coating film transfer tool shown in FIGS. 1a to 1g. The difference between the distance L that is between the inner surfaces of the side wall 1A and the side wall 1E of the coating film transfer toot A1 and the width R of the transfer head 4 was set to 3.0 mm. Also, the ratio M/N of the coating film transfer tool A1 shown in FIG. 3 was set to 7/13.

A coating film transfer tool C1 of Comparative Example 1 was prepared, and this coating film transfer tool C1 was the same as the coating film transfer tool A1 of Working Example 1, with the exception that plastic pieces with a thickness of 1.5 mm were inserted into the gap between the side wall 1A of the coating film transfer tool A1 and the transfer head 4 and the gap between the side wall 1E and the transfer head 4, respectively, and the transfer head 4 is fixed so as to not move from the center between the side wall 1A and the side wall 1E.

Figure 4:
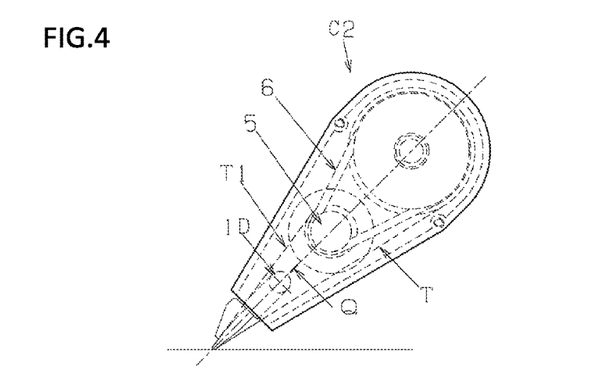
FIG. 4 is a diagram showing a coating film transfer tool C2 according to Comparative Example 2.

A coating film transfer tool C2 shown in FIG. 4 was prepared as Comparative Example 2. The coating film transfer tool C2 is the same as the coating film transfer tool A1 according to Working Example 1, except for the fact that it does not have the side wall 1A and the side wall 1E in the case 1, it does not have the shaft 7, and the transfer head is different as per the following points. The points that make the transfer head of the coating film transfer tool C2 different from the transfer head of the coating film transfer tool A1 are that, the transfer head is fixed to the case 1 and the cover 2 not by the shaft 7 but by a connection portion 1D provided integral to the transfer head, and that there are no guide walls 4B on the transfer-target surface side when the coating film is transferred.

Figure 5:
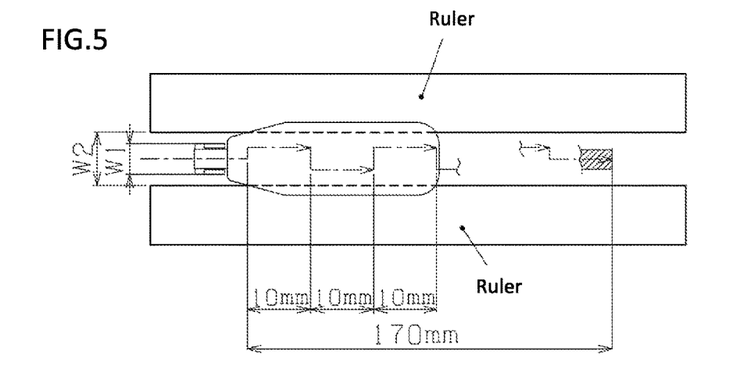
FIG. 5 is a diagram showing a coating film transfer testing method.

When using the coating film transfer tools A1, C1, and C2 of Working Example 1, Comparative Example 1, and Comparative Example 2, the transfer heads of the respective coating film transfer tools were purposely meandered as per the following method, and a coating film transfer test was performed to confirm the state of the transferred coating film. As shown in FIG. 5, a transfer-target body (a PPC sheet) was placed onto a flat table, and two rulers were placed thereon side by side equidistant (parallel) from each other. The coating film transfer test was performed three times using each of the coating film transfer tools in three patterns of (W2−W1), in which the gap between the two rulers is W2 and the width of the transfer head is W1, at 1.0 mm, 2.0 mm, and 3.0 mm. The coating film transfer test involved using the transfer head to transfer the coating film for a length of 10 mm in a state of being in contact with the ruler on the back side in FIG. 5, and then shifting the transfer head in the width direction of the transfer tape until the transfer head came into contact with the ruler on the front side in FIG. 5, then using the transfer head to transfer the coating film for a length of 10 mm in a state of being in contact with the ruler on the front side in FIG. 5, and then shifting the transfer head again in the width direction of the transfer tape until the transfer head came into contact with the ruler on the back side in FIG. 5, thus changing between which ruler the transfer head is in contact with every 10 mm for a total transfer length of 170 mm. In this measurement, the transfer speed of the coating film transfer tool was 20 mm/s, and while a total length of 170 mm of coating film was being transferred, the transfer head was pressed against the transfer-target surface with a pressing force of 5.0 N. Also, regarding the coating film transfer tools A1 and C1 of Working Example 1 and Comparative Example 1, while the coating film was being transferred, the tip portion 4A of the transfer head 4 that transfers the coating film and the guide walls 4B (two positions) were constantly in a state of pressing against the transfer-target surface.

When the transfer head shifted in the tape width direction, there were cases where the transferred coating film broke in the tape width direction, and finely streaked cracks appeared on the transferred coating film. These cracks occur due to meandering of the transfer head, and thus the meander amount of the transferred coating film and the number of cracks that occurred in each of the transferred coating films were checked.

Figure 6:
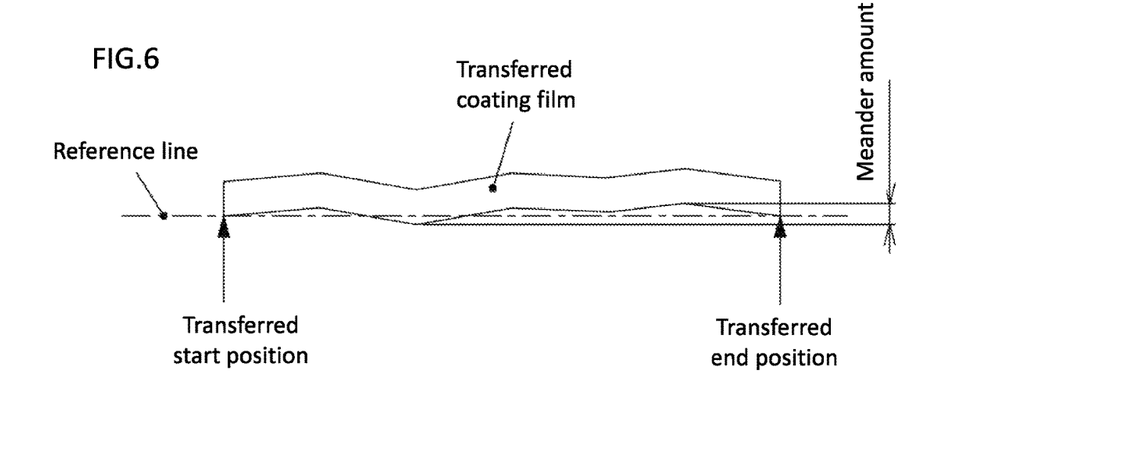
FIG. 6 is a diagram showing a method of measuring a meander amount.

In order to measure the meander amount, first, as shown in FIG. 6, a reference line was defined as a straight line that joins end portions on the same side in the width direction at a transfer start position of the transferred coating film and a transfer end position. Then the total of the distance from the reference line to the edge portion of the coating film at its most recessed position and the distance from the reference line to the edge portion of the coating film at its most protruded position was measured and used as the meander amount. Measurement of the meander amount was performed using a Measuring Microscope MM-800 made by NIKON, and the measurement value was obtained by rounding off the digit at the 1/100 mm position and used as the meander amount.

Evaluation results are shown in Table 1 and Table 2. Table 1 shows the results of measuring the meander amount, and Table 2 shows the results of the confirmed number of cracks that occurred. The coating film transfer tool A1 of Working Example 1 has a smaller transferred coating film meander amount and the number of cracks that occurred was lower compared to the coating film transfer tool C1 of Comparative Example 1 and the coating film transfer tool C2 of Comparative Example 2. From this result, the coating film transfer tool A1 of Working Example 1, compared to a conventional coating film transfer tool, was confirmed to have less meandering of the transfer coating film and the occurrence of defects such as cracks in the transfer coating film was lower even when the transfer head meandered.

TABLE 1

| | | Meander Amount of Transfer Head: W2-W1 | Transfer Coating Film Meander Amount (mm) | | | |
|---|---|---|---|---|---|---|
| | | (mm) | 1st time | 2nd time | 3rd time | Avg. |
| Working Example 1 | Coating film transfer tool A1 | 1.0 | 0.3 | 0.2 | 0.4 | 0.3 |
| Comparative Example 1 | Coating film transfer tool C1 | 1.0 | 1.0 | 0.9 | 0.9 | 0.9 |
| Comparative Example 2 | Coating film transfer tool C2 | 1.0 | 0.6 | 1.1 | 1.0 | 0.9 |
| Working Example 1 | Coating film transfer tool A1 | 2.0 | 0.5 | 0.2 | 0.7 | 0.5 |
| Comparative Example 1 | Coating film transfer tool C1 | 2.0 | 1.8 | 1.9 | 1.1 | 1.6 |
| Comparative Example 2 | Coating film transfer tool C2 | 2.0 | 1.3 | 1.3 | 0.8 | 1.1 |
| Working Example 1 | Coating film transfer tool A1 | 1.0 | 0.2 | 1.1 | 0.5 | 0.6 |
| Comparative Example 1 | Coating film transfer tool C1 | 3.0 | 3.0 | 2.8 | 2.8 | 2.9 |
| Comparative Example 2 | Coating film transfer tool C2 | 3.0 | 2.5 | 1.1 | 1.2 | 1.6 |

TABLE 2

| | | Meander Amount of Transfer Head W2-W1 | No. of Cracks Occurred (No.) | | | |
|---|---|---|---|---|---|---|
| | | (mm) | 1st time | 2nd time | 3rd time | Avg. |
| Working Example 1 | Coating film transfer tool A1 | 1.0 | 0 | 0 | 0 | 0 |

TABLE 2-continued

| | | Meander Amount of Transfer Head W2-W1 (mm) | No. of Cracks Occurred (No.) | | | |
|---|---|---|---|---|---|---|
| | | | 1st time | 2nd time | 3rd time | Avg. |
| Comparative Example 1 | Coating film transfer tool C1 | 1.0 | 8 | 8 | 9 | 8 |
| Comparative Example 2 | Coating film transfer tool C2 | 1.0 | 8 | 9 | 9 | 9 |
| Working Example 1 | Coating film transfer tool A1 | 2.0 | 1 | 2 | 1 | 1 |
| Comparative Example 1 | Coating film transfer tool C1 | 2.0 | 15 | 15 | 14 | 15 |
| Comparative Example 2 | Coating film transfer tool C2 | 2.0 | 13 | 8 | 14 | 12 |
| Working Example 1 | Coating film transfer tool A1 | 3.0 | 5 | 6 | 1 | 4 |
| Comparative Example 1 | Coating film transfer tool C1 | 3.0 | 15 | 16 | 15 | 15 |
| Comparative Example 2 | Coating film transfer tool C2 | 3.0 | 16 | 15 | 15 | 15 |

REFERENCE SIGNS LIST

A, B, X, A1, C1, C2 coating film transfer tool
T transfer tape
T1 backing tape
1 case
1A, 1E side wall (of case)
1B elastic portion
1C stopper
1D connection portion
2 cover
3 feeding core
3A pulley portion (of feeding core)
4 transfer head
4A tip portion
4B guide wall
4C hole
4D recessed portion
5 winding core
5A pulley portion (of winding core)
6 O ring
7 shaft
L distance between inner surfaces of side wall 1A and side wall 2A
R width of transfer head 4
M distance between the tip portion 4A and the hole 4C and is parallel to the transfer-target surface
N distance between the hole 4C and a guide wall contact position of a guide wall 4B and is parallel to the transfer-target surface

The invention claimed is:

1. A coating film transfer tool comprising:
a feeding portion configured to feed a transfer tape in which a coating film is provided on a backing tape;
a transfer press portion configured to press the transfer tape onto a transfer-target surface to transfer the coating film; and
a winding portion configured to wind up the backing tape after the coating film has been transferred, by rotating in conjunction with the feeding portion,
wherein the transfer press portion is provided with a transfer head configured to transfer the coating film,
the transfer head is movable in a width direction of the transfer tape independent of the feeding portion and the winding portion,
the transfer head is provided with a pair of guide walls configured to use their inner surfaces to restrict movement in the tape width direction of the transfer tape from which the coating film is yet to be transferred, and
the pair of guide walls and a tip portion of the transfer head configured to transfer the coating film is configured to press against the transfer-target surface at the same time,
wherein the coating film transfer tool further comprises an elastic portion configured to elastically deform when the transfer head moves in the width direction of the transfer tape, and bias the transfer head in a direction opposite to a direction in which the transfer head moves.

2. The coating film transfer tool according to claim 1, further comprising a holding member that holds the feeding portion and the winding portion,
wherein a shaft provided on the holding member is inserted into a hole provided in the transfer head, and the transfer head is configured to move in the width direction of the transfer tape relative to the holding member due to the hole sliding along the shaft.

3. The coating film transfer tool according to claim 2, wherein the shaft and the hole have a circular cross-sectional shape, and the transfer head is rotatable around the shaft.

* * * * *